US006370879B1

(12) United States Patent
Stalder et al.

(10) Patent No.: US 6,370,879 B1
(45) Date of Patent: Apr. 16, 2002

(54) DAMPING DEVICE FOR REDUCING THE VIBRATION AMPLITUDE OF ACOUSTIC WAVES FOR A BURNER

(75) Inventors: Marcel Stalder, Klingnau (CH); Franz Joos, Weilheim (DE)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/431,918

(22) Filed: Nov. 2, 1999

(30) Foreign Application Priority Data

Nov. 10, 1998 (DE) ........................................ 198 51 636

(51) Int. Cl.[7] .................................................. F02C 7/24

(52) U.S. Cl. .......................................... 60/725; 431/114

(58) Field of Search ......................... 123/192.1, 184.57, 123/184.53; 181/214, 229, 240; 50/725; 431/114

(56) References Cited

U.S. PATENT DOCUMENTS 3,370,575 A * 2/1968 Soubis .................. 123/184.57
3,491,733 A * 1/1970 Soubis .................. 123/184.57
4,932,861 A * 6/1990 Keller et al. ................... 431/8
5,002,021 A * 3/1991 Nakata et al. ......... 123/184.57
5,040,495 A * 8/1991 Harada et al. ......... 123/184.57
5,044,930 A * 9/1991 Hongo et al. .................. 431/1
5,373,695 A * 12/1994 Aigner et al. .............. 60/39.36
5,377,629 A * 1/1995 Brackett et al. ....... 123/184.56
5,479,885 A * 1/1996 Ausiello et al. ....... 123/184.55
5,571,239 A * 11/1996 Kameda et al. ........ 123/184.53
5,572,966 A * 11/1996 Doddy et al. .......... 123/184.57
5,628,287 A * 5/1997 Brackett et al. ....... 123/184.55
5,644,918 A * 7/1997 Gulati et al. .................. 60/725
5,839,405 A * 11/1998 Falkowski et al. ..... 123/184.57
5,957,102 A * 9/1999 Schorn .................. 123/184.57
6,106,276 A * 8/2000 Sams et al. ................. 431/114
6,155,224 A * 12/2000 Akihisa et al. ........ 123/184.57
6,196,835 B1 * 3/2001 Gutmark et al. ............ 431/350

FOREIGN PATENT DOCUMENTS

| | | | | |
|---|---|---|---|---|
| DE | 3324805 A1 | | 1/1985 | |
| DE | 4033269 A1 | | 4/1992 | |
| DE | 19640980 A1 | | 4/1998 | |
| EP | 0597183 A1 | | 5/1994 | |
| EP | 0974788 A1 | | 1/2000 | |
| SU | 1328566 | * | 8/1987 | ............ 123/184.57 |
| SU | 1460374 | * | 2/1989 | ............ 123/184.57 |
| WO | WO93/10401 | | 5/1993 | |

* cited by examiner

*Primary Examiner*—Tony M. Argenbright
*Assistant Examiner*—Hai Huynh
(74) *Attorney, Agent, or Firm*—Burns, Doane, Swecker & Mathis, L.L.P.

(57) ABSTRACT

A damping device for reducing the vibration amplitude of acoustic waves and a burner for operating an internal combustion engine, the burner having a mixing region, in which an air flow and a fuel flow are mixed with one another to form an air/fuel mixture, and a combustion chamber, which in the direction of flow of the fuel/air mixture is arranged downstream of the mixing region, in which the fuel/air mixture can be ignited. A Helmholtz resonator directly connected to the mixing region of the burner such that acoustic waves formed in the burner are suppressed in the Helmholtz resonator and are not reflected back into the burner.

11 Claims, 1 Drawing Sheet

Figure 1:
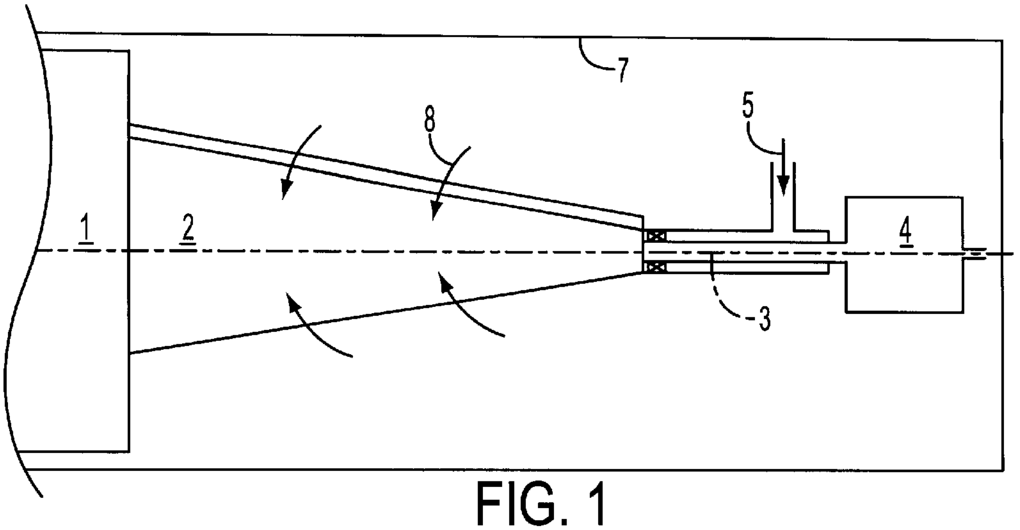

DAMPING DEVICE FOR REDUCING THE VIBRATION AMPLITUDE OF ACOUSTIC WAVES FOR A BURNER

FIELD OF THE INVENTION

The invention relates to a damping device for reducing the vibration amplitude of acoustic waves for a burner in an internal combustion engine.

BACKGROUND OF THE INVENTION

During the combustion of fuel in combustion chambers which are used, for example, in aircraft engines or in burners for operating thermal power stations, preferably in gas-turbine plants, the occurrence of so-called combustion-chamber pulsations, which form as acoustic waves, is known and it is attempted to specifically suppress said pulsations by suitable design measures. For example, in afterburner systems in aircraft engines, so-called back-purged aperture plates are used as walls, and these aperture plates serve both to cool the wall and to dampen the acoustic waves occurring inadvertently.

Such back-purged aperture plates are likewise used in conventional gas-turbine combustion chambers and in principle perform the same task in the latter, namely to cool the combustion-chamber wall and specifically suppress acoustic vibrations forming inside the combustion chamber.

In the course of the optimized design of combustion chambers with regard to the reduction in the pollutant emission, the combustion chambers themselves are increasingly designed without cooling-air feeds into the combustion chamber, since all the air is required for the low-pollution combustion. This design, due to the reflecting walls, results in very low acoustic damping, so that such combustion chambers are often provided with additional damping elements.

As a rule, the damping elements work according to the principle of the so-called Helmholtz resonator. Helmholtz resonators are in principle volume elements, the resonance behaviour of which may be set in such a way that they specifically dampen mechanical or acoustic waves of certain frequencies which pass through them.

Approaches are known with which the suppression of acoustic waves inside combustion chambers has been attempted with the use of Helmholtz resonators. In this case, Helmholtz resonators were arranged in the so-called combustion-chamber dome next to the actual burner, as a result of which, on the one hand, the amplitude of the acoustic wave can be attenuated; however, it is not possible in this way to completely reduce the direct effect of the burner on the generation of acoustic waves.

SUMMARY OF THE INVENTION

The object of the invention is therefore to develop a damping device for reducing the vibration amplitude of acoustic waves for a burner for operating an internal combustion engine, preferably for driving a gas-turbo group, which burner normally provides a mixing region, in which an air flow and a fuel flow are mixed with one another to form an air/fuel mixture, and a combustion chamber, which in the direction of flow of the fuel/air mixture is arranged downstream of the mixing region, in which the fuel/air mixture can be ignited, in such a way that any acoustic vibrations occurring inside the burner are to be more or less largely suppressed. The damping device according to the invention is to provide possibilities for subsequent fitting in existing internal combustion engines and is to permit easy tuning of the resonance behaviour to the respective burner.

According to the invention, a damping device for reducing the vibration amplitude of acoustic waves and a burner for operating an internal combustion engine is developed owing to the fact that a Helmholtz resonator is directly connected to the mixing region of the burner in such a way that acoustic waves forming in the burner are suppressed in the Helmholtz resonator and are not reflected back into the burner.

The idea underlying the invention is the direct integration of a Helmholtz resonator in the burner itself, so that the acoustic waves produced inside the burner can be completely absorbed by the Helmholtz resonator, which is directly connected to the combustion chamber itself via the mixing region. In this way, the acoustic waves occurring in the interior of the burner are no longer reflected, since the burner, due to the Helmholtz-resonator volume integrated in the burner, has an acoustic adapted rear wall, on which the acoustic waves can no longer be reflected back. This adaptation may also be achieved by means of a quarter-wave volume, as will be explained in more detail further below.

Acoustic feedbacks can be specifically avoided by means of the Helmholtz resonator provided directly in the burner, as a result of which an undesirable feedback of a forming acoustic wave, for example in the region in which the fuel/air mixture is ignited and which is of crucial importance for the conversion of energy, can be completely avoided. Precisely such feedbacks, in combustion-chamber systems of conventional design, lead to undesirable combustion-chamber pulsations, which lead to a considerable decrease in the overall combustion efficiency.

Thus burners which have a conical mixing region, which directly adjoins the combustion chamber, inside which the fuel/air mixture is ignited, have become established for the firing of gas-turbine plants. Such a burner has been disclosed, for example, by EP 0 321 809 B1 and is used with great success for the firing of gas-turbine plants, this publication forming an integral part of the present description. The damping element in the form of a Helmholtz resonator is preferably arranged directly at the tip of the conical burner. The Helmholtz resonator may either be closed on one side or be designed for the passage of supply air and/or fuel.

In order to prevent adverse effects on the acoustic vibration behaviour of the entire burner, which effects may stem from additional fuel or supply-air feed lines into the burner system, such feed lines are preferably to be arranged between the Helmholtz resonator and the burner or the mixing region.

For example, a fuel feed line which is provided in particular for the starting phase and is normally designated as pilot-gas line is attached between the burner and the Helmholtz resonator. Due to the direct proximity between Helmholtz resonator and pilot-gas feed into the air or fuel flow of the burner itself, the damping behaviour of the Helmholtz resonator also acts directly on the action of the additional pilot-gas feed.

In order to be able to individually tune the resonance behaviour of the Helmholtz resonator to the burner, provision is made for the Helmholtz resonator to be longitudinally displaceable relative to the burner. This may be effected, for example, via a telescopic connecting line to the burner or, in the simplest case, via a screw thread, by means of which the Helmholtz resonator and burner inlet may be spaced apart individually.

In a suitable manner, the Helmholtz resonator itself may provide adjusting elements which vary the volume of the Helmholtz resonator and by means of which the resonance behaviour of the Helmholtz resonator may likewise be adapted individually.

The Helmholtz resonator is preferably provided as close to the burner as possible or even in the burner itself. In order to avoid any irritations of the flow with regard to the combustion supply air in the mixing region of the burner, it is advantageous for the Helmholtz resonator to be attached outside a burner dome surrounding the burner. Likewise, measures may be taken to ensure that the Helmholtz resonator is also attached inside the burner casing in an integrated type of construction without impairing the combustion-supply-air flow in the process.

In principle, the provision of a Helmholtz resonator for damping acoustic vibrations inside a burner is not restricted to burner types which provide a mixing region designed in the manner described; burner types which have no swirl-generating central body inside the burner may also be equipped with the damping element according to the invention.

In this context, according to the object of the invention, a quarter-wave damper, as already mentioned above., can be fitted, this damper being based on a unidimensional stationary wave.

BRIEF DESCRIPTION OF THE INVENTION

Figure 2:
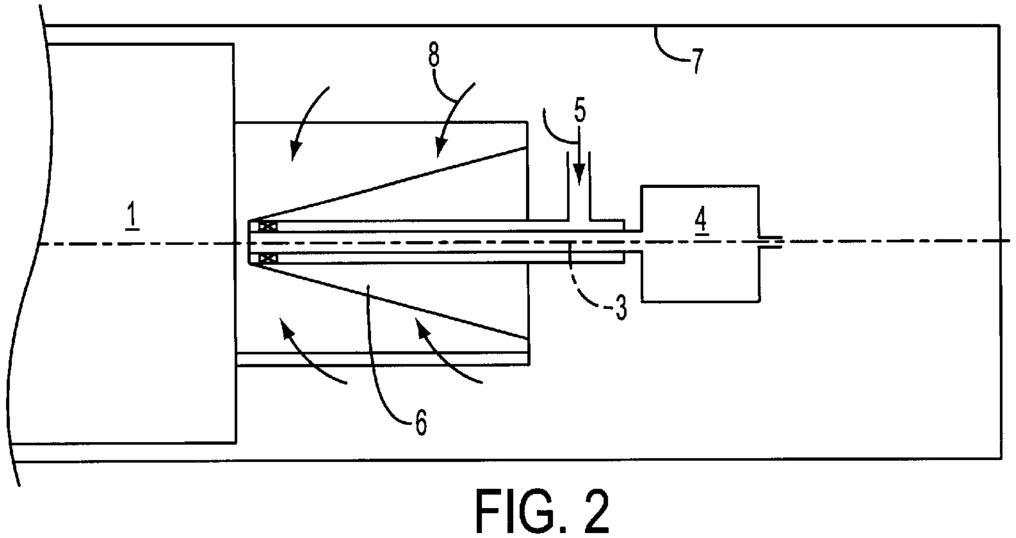
Figure 3:
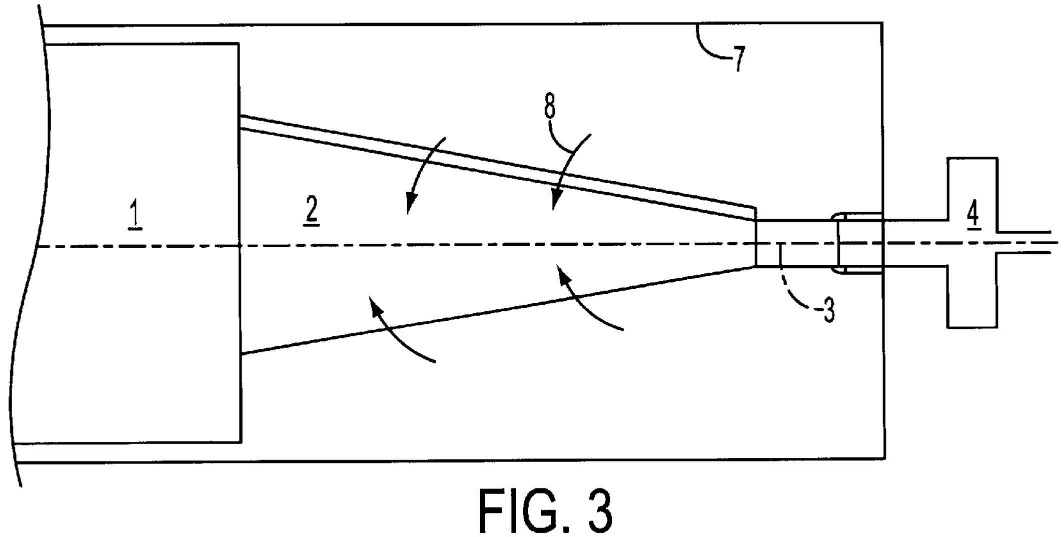

The invention, without restricting the general inventive idea, is described by way of example with the aid of exemplary embodiments and with reference to the drawing, in which:

FIG. 1 shows a combination of a burner with a conically designed mixing region and a Helmholtz resonator, FIG. 2 shows a combination of a burner with a conically designed central body and a Helmholtz resonator, and FIG. 3 shows a combination of a burner with a Helmholtz resonator arranged so as to be displaceable relative to the mixing region.

DETAILED DESCRIPTION OF THE INVENTION

FIG. 1 shows a highly schematic cross-sectional representation through a burner, which is described in detail, for example, in EP 0 321 809 B1.

Directly adjoining the combustion chamber 1 is a conically designed mixing region 2, the inner construction and mode of operation of which will not be dealt with in detail at this point; for further details, reference is made to the aforesaid European publication. A Helmholtz resonator 4 is directly provided at the tip of the conically designed mixing region 2 via a feed line 3 and is connected via an open volume to the mixing region 2 and the combustion chamber 1. The acoustic waves produced in the interior of the combustion chamber 1 or the mixing region 2 may be specifically damped by means of a suitable Helmholtz resonator 4 tuned to the resonance behaviour of the burner. A reflection of acoustic waves, which in the burner form shown according to FIG. 1 run from left to right into the interior of the Helmholtz resonator 4, is specifically damped there and is not reflected back into the interior of the burner.

In the case shown according to FIG. 1, the Helmholtz resonator 4 has two opposite openings, so that a mass flow, for example air or fuel flow, can pass through this Helmholtz resonator 4.

The burner 4 may optionally be provided with a pilot-gas feed line 5, which is preferably arranged between Helmholtz resonator 4 and mixing region 2.

Unlike the burner form according to FIG. 1, the burner shown in FIG. 2 has a V-shaped central body 6, which in the same way as the conical mixing region 2 serves for the specific mixing of combustion air 8 and fuel. In the case of the burner according to FIG. 2, a Helmholtz resonator 4 for the specific damping of acoustic waves is also provided directly upstream of the central body 6 via a feed line 3. Optionally, in this case too, an additional pilot-gas feed line 5 may be provided.

For the individual tuning of the resonance behaviour of the Helmholtz resonator 4 relative to the burner, the exemplary embodiment according to FIG. 3 provides a cavity resonator 4 which is longitudinally displaceable inside the feed line 3 relative to the mixing region 2. In this way, specific resonance tuning can be carried out without great additional expenditure. In addition to the longitudinal displaceability, which can be realized either by means of two tubes sliding one inside the other or, in the simplest case, by means of a screw thread, the Helmholtz resonator 4 has adjusting elements (not shown in any more detail), by means of which the resonator volume of the Helmholtz resonator 4 can be varied.

In contrast to the above embodiments according to FIGS. 1 and 2, in which the Helmholtz resonator 4 is arranged inside a casing surrounding the entire burner, the exemplary embodiment according to FIG. 3 provides for the arrangement of the Helmholtz resonator 4 outside the casing 7. Such an external arrangement of the Helmholtz resonator 4 relative to the casing 7 serves in particular for an undisturbed combustion supply-air flow inside the mixing region 2 inside the casing 7, even though the acoustic damping behaviour is essentially determined by the Helmholtz resonator 4.

Although this invention has been illustrated and described in accordance with certain preferred embodiments, it is recognized that the scope of this invention is to be determined by the following claims.

What is claimed is:

1. A damping device for reducing the vibration amplitude of acoustic waves in an internal combustion engine, said device comprising:

a burner for operating an internal combustion engine, said burner having:

a mixing region, in which an air flow and a fuel flow are mixed with one another to form an air/fuel mixture, and a combustion chamber, which in the direction of flow of the fuel/air mixture is arranged downstream of the mixing region, in which the fuel/air mixture can be ignited; and a Helmholtz resonator directly connected to the mixing region of the burner, such that, acoustic waves which are formed in the burner are suppressed in the Helmholtz resonator and are not reflected back into the burner.

2. A damping device according to claim 1, wherein the Helmholtz resonator is arranged upstream of the mixing region in the direction of flow of the fuel/air mixture.

3. A damping device according to claim 1, wherein said mixing region is conically designed, wherein the combustion chamber adjoins the largest diameter of said conically designed mixing region and the Helmholtz resonator is attached to the smallest diameter of said mixing region.

4. A damping device according to claim 3, wherein a fuel feed line and/or oil nozzles are provided between said Helmholtz resonator and said mixing region.

5. A damping device according to claim 4, wherein the fuel feed line is for the feeding of pilot gas.

6. A damping device according to claim 1, wherein the Helmholtz resonator is arranged so as to be displaceable relative to the mixing region in order to permit frequency tuning with a closed volume of the Helmholtz resonator.

7. A damping device according to claim 1, wherein a casing surrounds the burner.

8. A damping device according to claim 7, wherein the Helmholtz resonator is arranged inside the casing.

9. A damping device according to claim 7, wherein the Helmholtz resonator is arranged outside the casing.

10. A damping device according to claim 1, wherein the mixing region is designed as a swirl generator, within which a fuel/air mixture whirling about an axis forms.

11. A damping device for reducing the vibration amplitude of acoustic waves in an internal combustion engine, said device comprising:

a burner for operating an internal combustion engine, said burner having:

a mixing region, in which an air flow and a fuel flow are mixed with one another to form an air/fuel mixture, and a combustion chamber, which in the direction of flow of the fuel/air mixture is arranged downstream of the mixing region, in which the fuel/air mixture can be ignited; and wherein a quarter-wave tube is used for reducing the vibration amplitude of acoustic waves.

* * * * *